(12) United States Patent
Schroeder et al.

(10) Patent No.: US 7,221,151 B2
(45) Date of Patent: May 22, 2007

(54) MAGNETIC ARRAY POSITION SENSOR

(75) Inventors: Thaddeus Schroeder, Rochester Hills, MI (US); Jose Alberto Guerra, Chih (MX); Joseph Pierre Heremans, Troy, MI (US); Dale L. Partin, Ray Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 170 days.

(21) Appl. No.: 10/603,462

(22) Filed: Jun. 25, 2003

(65) Prior Publication Data

US 2004/0263155 A1 Dec. 30, 2004

Related U.S. Application Data

(63) Continuation-in-part of application No. 10/356,457, filed on Jan. 31, 2003, now Pat. No. 6,992,479.

(51) Int. Cl.
*G01B 7/14* (2006.01)
*G01B 7/30* (2006.01)
*G01R 33/07* (2006.01)
*G01R 33/09* (2006.01)
*H01L 43/06* (2006.01)
*H01L 43/08* (2006.01)

(52) U.S. Cl. .......................... 324/207.24; 324/207.2; 324/207.21; 324/207.25

(58) Field of Classification Search ............ 324/207.2–207.25; 73/510; 338/32 R, 32 H
See application file for complete search history.

(56) References Cited

U.S. PATENT DOCUMENTS

| | | | |
|---|---|---|---|
| 3,260,932 A * | 7/1966 | Weiss et al. ............... 324/252 |
| 3,934,160 A * | 1/1976 | Von Borcke ............... 327/510 |
| 4,041,371 A * | 8/1977 | Hini ............................ 323/368 |
| 4,466,002 A * | 8/1984 | Hill ........................ 340/870.31 |
| 4,697,144 A * | 9/1987 | Howbrook ............. 324/207.17 |
| 4,737,710 A * | 4/1988 | Van Antwerp et al. ... 324/207.2 |
| 5,111,410 A * | 5/1992 | Nakayama et al. ......... 434/258 |
| 5,327,077 A * | 7/1994 | Honda .................... 324/207.21 |
| 5,552,944 A * | 9/1996 | Clemow ....................... 360/76 |
| 5,589,769 A * | 12/1996 | Krahn .................... 324/207.26 |
| 5,608,317 A * | 3/1997 | Hollmann ................ 324/207.2 |
| 5,916,459 A * | 6/1999 | Schroeder et al. ...... 219/121.66 |
| 6,100,681 A * | 8/2000 | Tsuruta .................... 324/207.2 |
| 6,232,770 B1 | 5/2001 | Schroeder |
| 6,291,989 B1 | 9/2001 | Schroeder |
| 6,486,656 B1 | 11/2002 | Schroeder |
| 6,486,659 B1 | 11/2002 | Schroeder |

(Continued)

FOREIGN PATENT DOCUMENTS

EP 1003040 A2 * 10/1999

*Primary Examiner*—Edward Lefkowitz
*Assistant Examiner*—Kenneth J. Whittington
(74) *Attorney, Agent, or Firm*—Paul L. Marshall

(57) ABSTRACT

A sensor apparatus and method that can measure either a linear position or an angular position of a device. A linear array of galvanomagnetic sensing elements is fixedly mountable adjacent the device. A target is connectable to the device such that the target moves adjacent a surface of the linear array in response to movement of the device and is shaped so that a magnetic flux density curve resulting from excitation of the sensing elements includes a peak and/or a valley. A first circuit excites each of the sensing elements, and a second circuit measures a magnetic flux density value at each of the sensing elements. A maximum and/or a minimum of the flux density curve indicates the position of the device.

45 Claims, 9 Drawing Sheets

U.S. PATENT DOCUMENTS 6,498,482 B2 * 12/2002 Schroeder .............. 324/207.21
6,509,732 B1 * 1/2003 Rhodes et al. ......... 324/207.12
6,630,882 B1 10/2003 Heremans et al.
6,690,842 B1 * 2/2004 Silver et al. ................ 382/300
6,782,306 B2 * 8/2004 Yutkowitz .................. 700/189
2001/0038281 A1 * 11/2001 Nyce et al. ............ 324/207.13
2003/0197504 A1 * 10/2003 Gray et al. ............. 324/207.24
2004/0150393 A1 * 8/2004 Lequesne et al. ...... 324/207.21
2004/0196028 A1 * 10/2004 Schroeder et al. ..... 324/207.22
2004/0217757 A1 * 11/2004 Tromblee ................ 324/207.2

* cited by examiner

MAGNETIC ARRAY POSITION SENSOR

This application is a continuation-in-part of application Ser. No. 10/356,457 filed Jan. 31, 2003 now U.S. Pat. No. 6,992,479 by Bruno P. B. Lequesne, Avoki M. Omekanda and Thaddeus Schroeder, which was published on Aug. 5, 2004 as Publication Number US2004/0150393 A1.

TECHNICAL FIELD

The invention relates to position sensors and, more particularly, to position sensors using a magnetic linear array.

BACKGROUND OF THE INVENTION

Galvanomagnetic sensing elements, such as Hall generators and different types of magnetoresistors (MRs), are widely used in automotive and industrial position and speed sensors. They can operate in most environments as they are relatively unaffected by dirt, most chemicals, oils and other lubricants. They can operate up to reasonably high temperatures (150 or 200 degrees C.) depending on the sensing device material.

The majority of these sensors use one, or at most two, sensing elements. Sensors with a single sensing element are the simplest, but also the least accurate. Sensors with two matched sensing elements spaced some distance apart from each other are used in a differential mode, whereby common mode disturbances are rejected. Two element sensors operating in differential mode provide better accuracy than single element sensors. Since they are capable of locating with high accuracy a particular feature of the sensed object, such as a tooth edge or a center of a slot, such differential sensors are often used as incremental (on-off) sensors, e.g., as crankshaft position sensors. The differential sensor, however, cannot maintain the same high accuracy if it is used as a linear sensor, providing a continuous analog output signal proportional to displacement. This is especially true where relatively large displacements, i.e., those on the order of five mm or higher, are measured.

SUMMARY OF THE INVENTION

A highly accurate sensor is needed that can be used as a common building block for a variety of specific continuous analog sensors with 0.1% or better accuracy, whether measuring angular or linear position. One embodiment of the present invention is a magnetic position sensor for measuring a linear position or an angular position of a device. The sensor includes a linear array of galvanomagnetic sensing elements mounted upon a surface of a magnet fixedly mountable adjacent the device. The sensor also includes a target connectable to the device such that the target moves adjacent a surface of the array in response to movement of the device. The target is shaped so that a magnetic flux density curve resulting from excitation of the sensing elements includes a peak and/or a valley. A first circuit is used for exciting each of the sensing elements, and a second circuit is used for measuring a magnetic flux density value at each of the sensing elements. Each magnetic flux density value is associated with the magnetic flux density curve. A maximum of the peak and/or a minimum of the valley indicates the linear or angular position of the device.

A second embodiment of the present invention is a method of measuring a linear position or an angular position of a device. The method includes the step of fixedly mounting a magnet adjacent the device, wherein a linear array of galvanomagnetic sensing elements is mounted upon a surface of the magnet. The method also includes the step of connecting a target to the device such that the target moves adjacent a surface of the array in response to movement of the device. The target is shaped so that a magnetic flux density curve resulting from excitation of the sensing elements includes a peak and/or a valley. Finally, the method includes the steps of exciting each of the sensing elements and measuring a magnetic flux density value at each of the sensing elements. Each magnetic flux density value is associated with the magnetic flux density curve and a maximum of the peak and/or a minimum of the valley indicates the linear or angular position of the device.

Many variations in the embodiments of present invention are contemplated as described herein in more detail. Other applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawings wherein like reference numerals refer to like parts throughout the several views, and wherein.

DESCRIPTION OF THE PREFERRED EMBODIMENT

Figure 1:
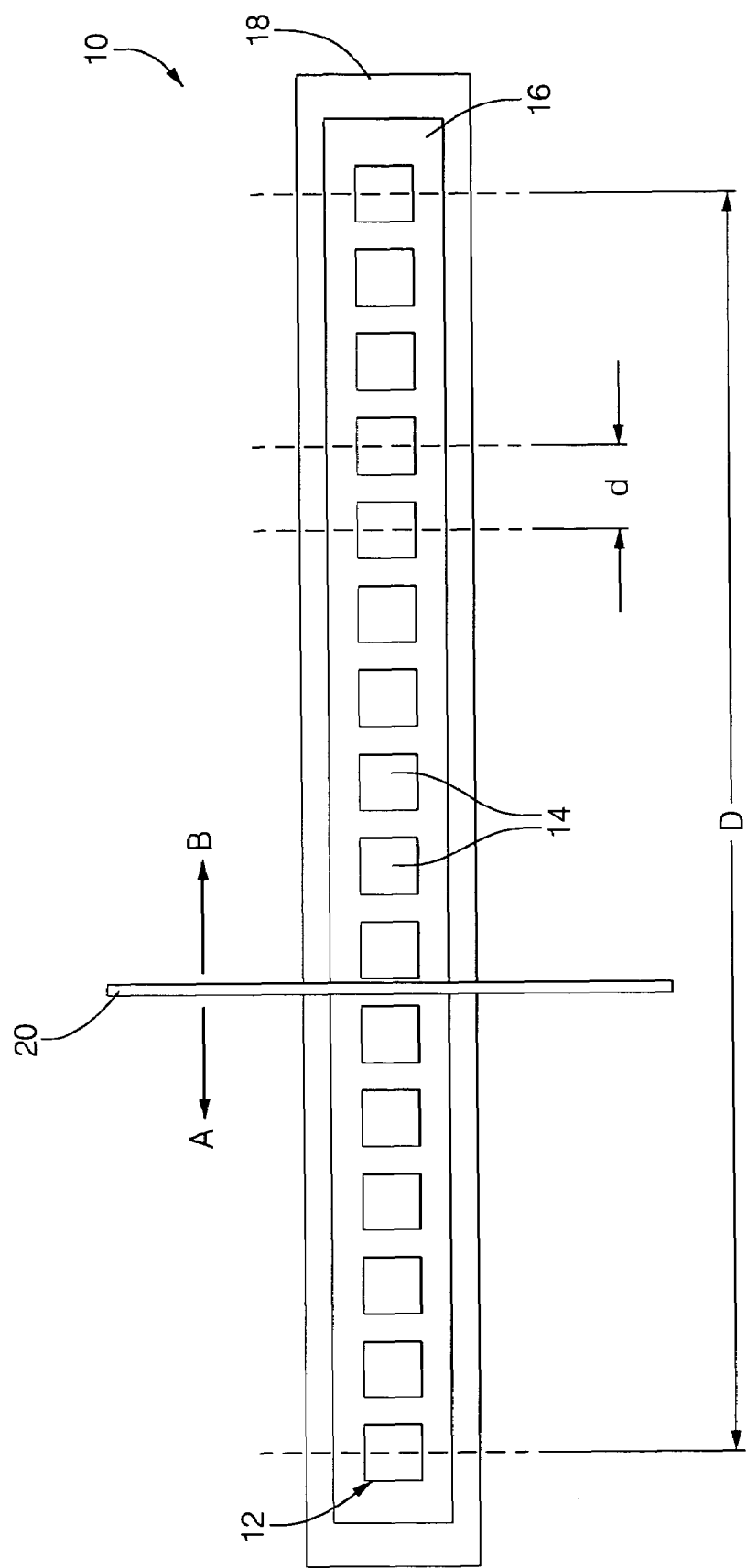
FIG. 1 is a top schematic view of an array sensor in accordance with the present invention.

The use of a magnetic array position sensor as a continuous analog sensor to measure either angular or linear position are shown in the drawing with reference to FIGS. 1-12. The basic principles are illustrated starting with FIGS. 1-5. FIG. 1 shows an array sensor 10 that can be used in the present invention. The sensor 10 includes a linear array 12 mounted on a bias magnet 18. Alternatively, an electromagnet can be used in place of the bias magnet 18. The array 12 is linear, i.e., it comprises a plurality of roughly identical and equidistantly-spaced galvanomagnetic sensing elements 14 on a single die 16. Of course, more than one die 16 can also be used to form the linear array 12. The sensing elements 14 of the linear array 12 can be Hall elements or magnetoresistive elements, by example. Details of the construction of one linear array 12 that can be used in the present invention are disclosed in U.S. Pat. No. 6,201,466, the entire contents of which is incorporated herein by reference. In the example of FIG. 1, the linear array 12 has sixteen sensing elements 14 spaced equidistantly by a value d along the length of the linear array 12. The sensing elements 14 are identified as array element numbers 0-15. The total distance between the first and last array elements, array element numbers 0 and 15 in this example, is indicated by a distance D.

FIG. 1 also shows a target in the form of a magnetic strip 20 movably supported in a non-magnetic block 24 (shown in FIGS. 3A and 6) above the linear array 12. The target can be one of a variety of configurations, as discussed in more detail below. The target is typically supported by a target assembly (not shown). The bottom of the target is located above the top surfaces of the sensing elements 14, defining an air gap 19 (shown in FIG. 6). Although described as an "air gap," the air gap 19 between the target and the sensing elements 14 does not necessarily exist as empty space. An overmolding layer protecting the sensor array 12 and a protective coating for the target and target assembly, if used, are magnetically indistinguishable from air and comprise part of the air gap 19. The strip target 20 in this example is narrower than the spacing d between the sensing elements 14 and moves in the directions indicated by the arrows A and B in response to the movement of a device to which it is attached.

Figure 2:
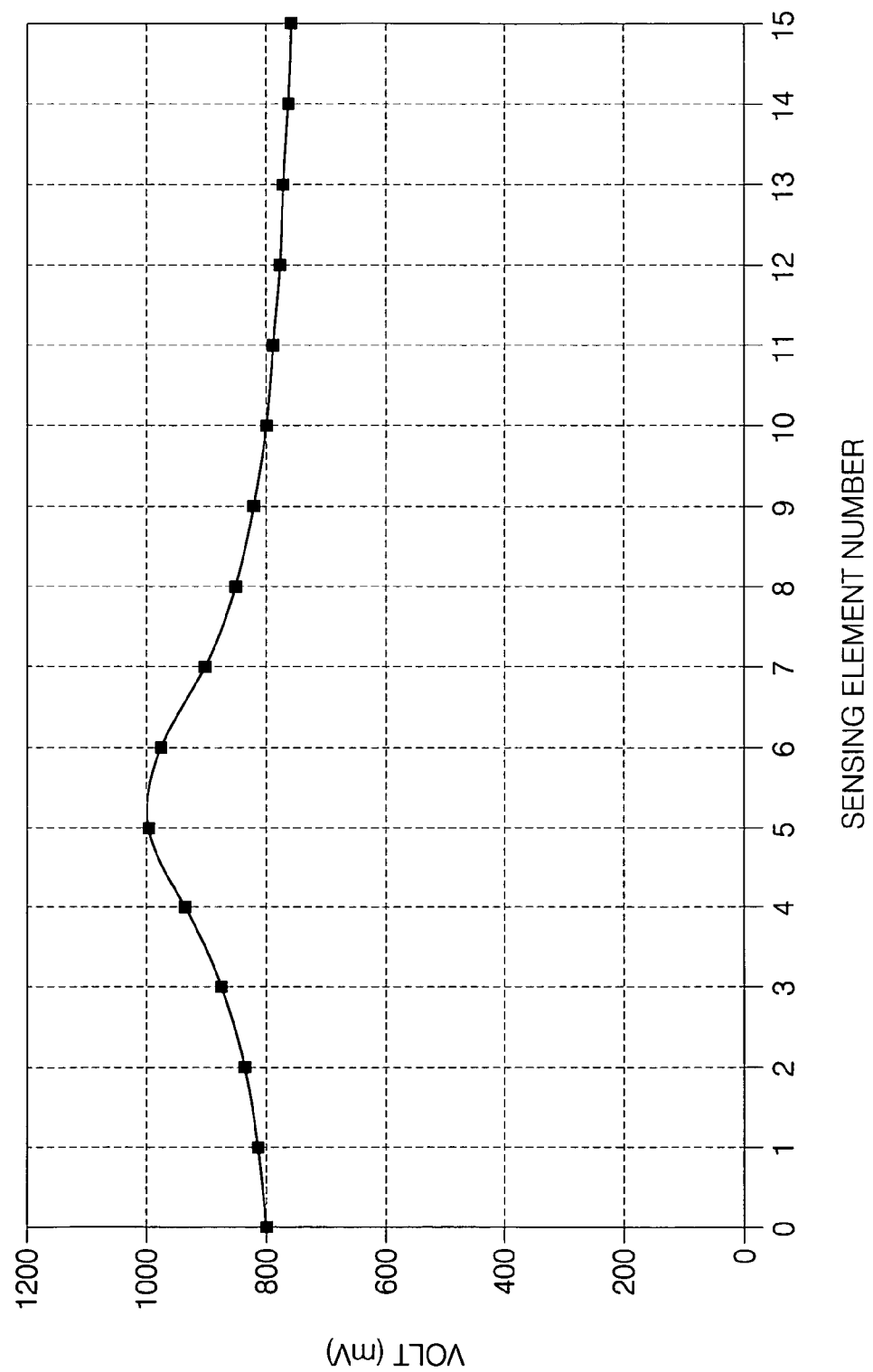
FIG. 2 is a graph of the magnetic image resulting from the array sensor according to FIG. 1.
Figure 3:
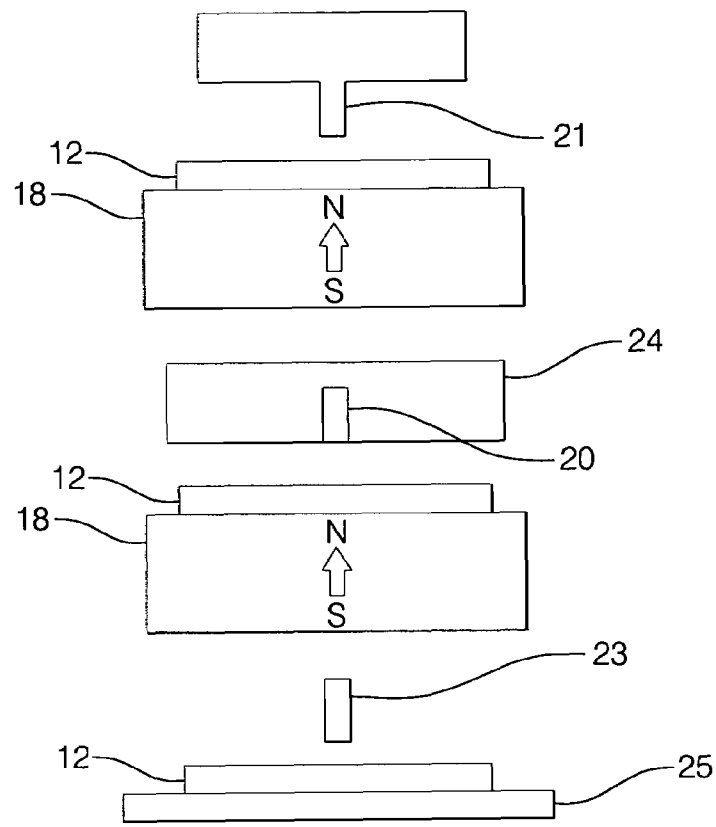
FIG. 3A includes cross-sectional views of three target configurations that can be used in accordance with the present invention to produce a magnetic flux density curve having a peak.
FIG. 3B includes cross-sectional views of two target configurations that can be used in accordance with the present invention to produce a magnetic flux density curve having a valley.
Figure 3:
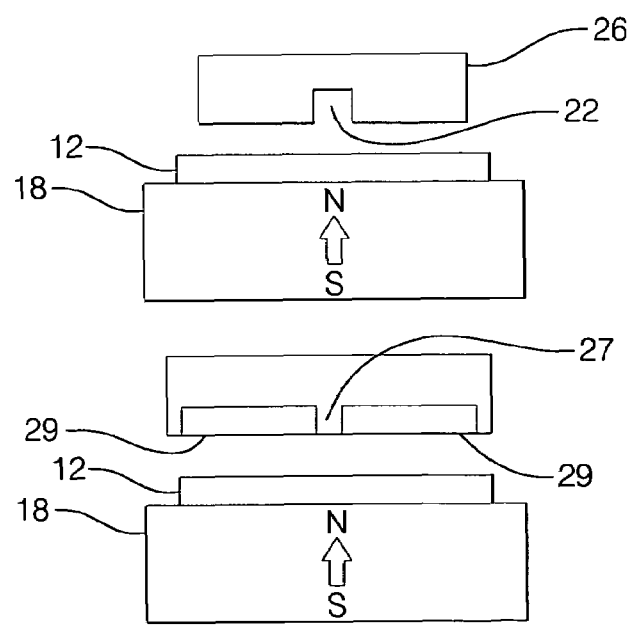

As mentioned, the target can be one of a variety of configurations. The only requirement for the target is that its presence at a position above the linear array 12 will result in a peak or valley in the magnetic flux density sensed by the array elements 14. This peak or valley should be roughly symmetrical about the location of the respective maximum or minimum. For example, FIG. 2 graphs the component of magnetic flux density normal to the length of the array 12 and the magnet 18 of FIG. 1. While the whole magnetic flux density curve is not symmetrical about the location of the maximum, a roughly symmetrical peak is shown about the location of the strip target 20 between sensing element numbers 5 and 6. FIG. 2 will be discussed in more detail hereinafter. Locating the highest point in a peak, or the lowest point in a valley, indicates the relative position movement of the device to which the target is attached, and thus its linear or angular position.

Example configurations for the target are shown in FIGS. 3A and 3B. FIG. 3A shows two configurations that will result in a peak, in addition to the familiar target comprising the magnetic strip 20 in the non-magnetic block 24. The target shown at the top of FIG. 3A comprises a magnetic tooth 21 extending toward the array 12 from an integral magnetic mount, here a block. At the bottom of FIG. 3A the target is a narrow magnet 23 movably mounted above the array 12. In this embodiment, the array 12 is mounted upon a magnetic base 25. Any target that results in a peak is generically referred to herein as a magnetic tooth. Two configurations for a target that will produce a valley when the target is in the presence of the array 12 are shown in FIG. 3B. At the top of FIG. 3B, a magnetic slot 22 is located in a magnetic mount, block 26. The target at the bottom of FIG. 3B is a slot 27 extending from a nonmagnetic mount, where two magnetic strips or blocks 29 embedded in the nonmagnetic mount form the slot 27. Any target that results in a valley is generically referred to herein as a magnetic slot.

A magnetic tooth or slot whose presence at a position above the linear array 12 will result in a peak or valley when viewing the magnetic flux density generated by the magnet 18 and sensed by the array elements 14 is desirable. This is because the position of the peak or valley, i.e., the location of the maximum or minimum voltage is immune to air gap variations. In contrast, the highly nonlinear relation between magnetic field density and the size of an air gap affects the magnitude and the slope of the magnetic image of a tooth edge and, hence, the location of any predetermined point on the slope that could be used as a reference point, e.g., the midpoint, in determining target position. Other characteristics of the target will be discussed in further detail herein.

Processing circuitry is operatively connected to the linear array 12 according to known methods to excite the sensing elements 14. The processing circuitry is also capable of scanning a voltage potential across each of the sensing elements 14 and digitizing these scanned output signals. The voltage potential across each of the sensing elements 14 is directly related to, and thus can be used to represent, the component of magnetic flux generated by the magnet 18 normal to the length of the magnet at that point. The processing circuitry can be a microprocessor or a digital signal processor (DSP) or the like connected to the linear array 12 by leads or integrated with the linear array 12 on the same die 16. The processing circuitry preferably includes memory, but it could be connected to external memory capable of storing the digitized data and storing a program including one or more algorithms, described in further detail herein, to determine the precise position of the movable target or portion of the target facing the linear array 12 by locating the maximum or minimum value of the curve created by the individual voltage potentials.

Figure 4:
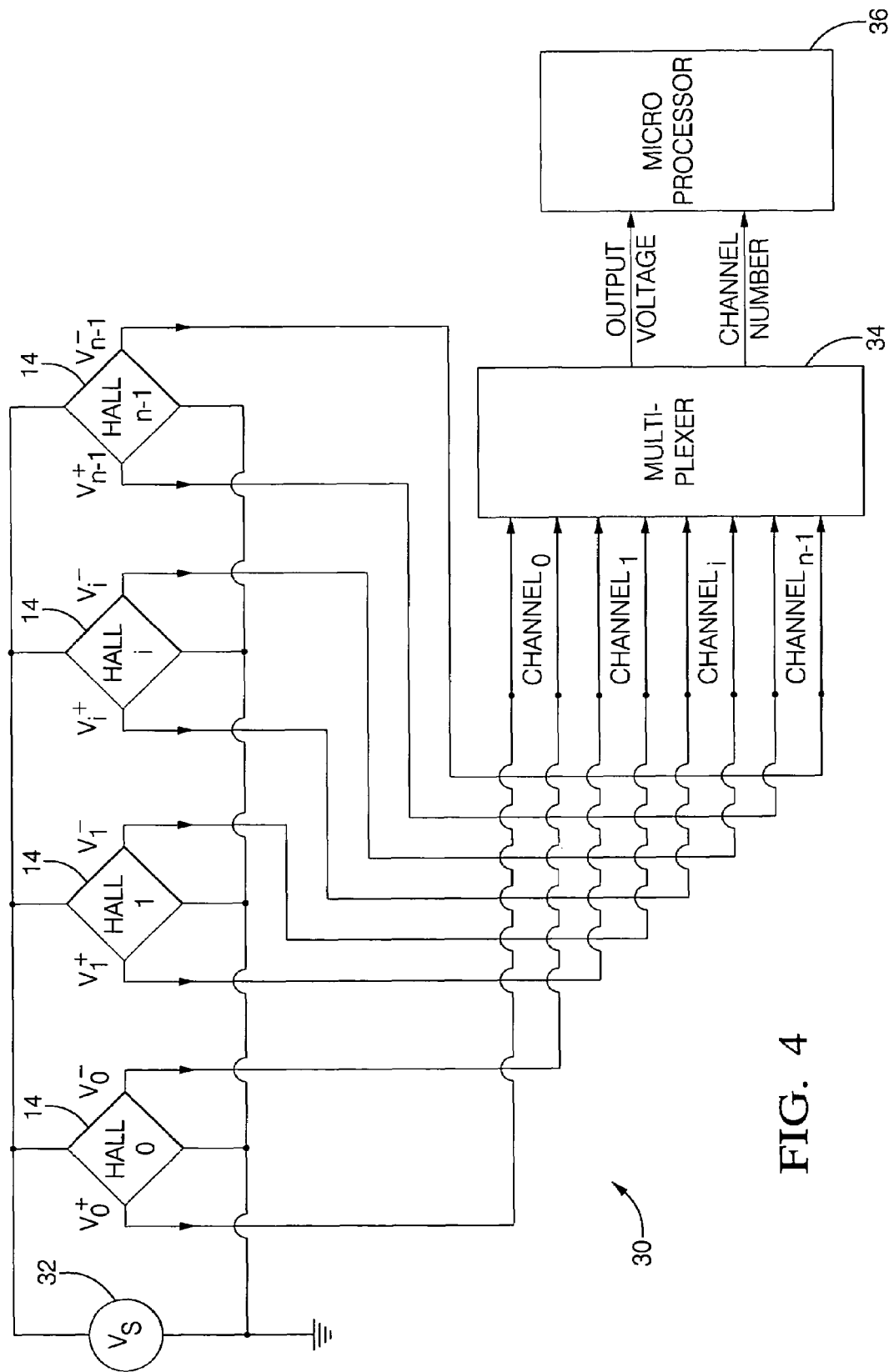
FIG. 4 is a circuit diagram including a circuit for exciting a Hall element sensor array and a circuit for measuring the resultant magnetic flux density through the array elements.
Figure 5:
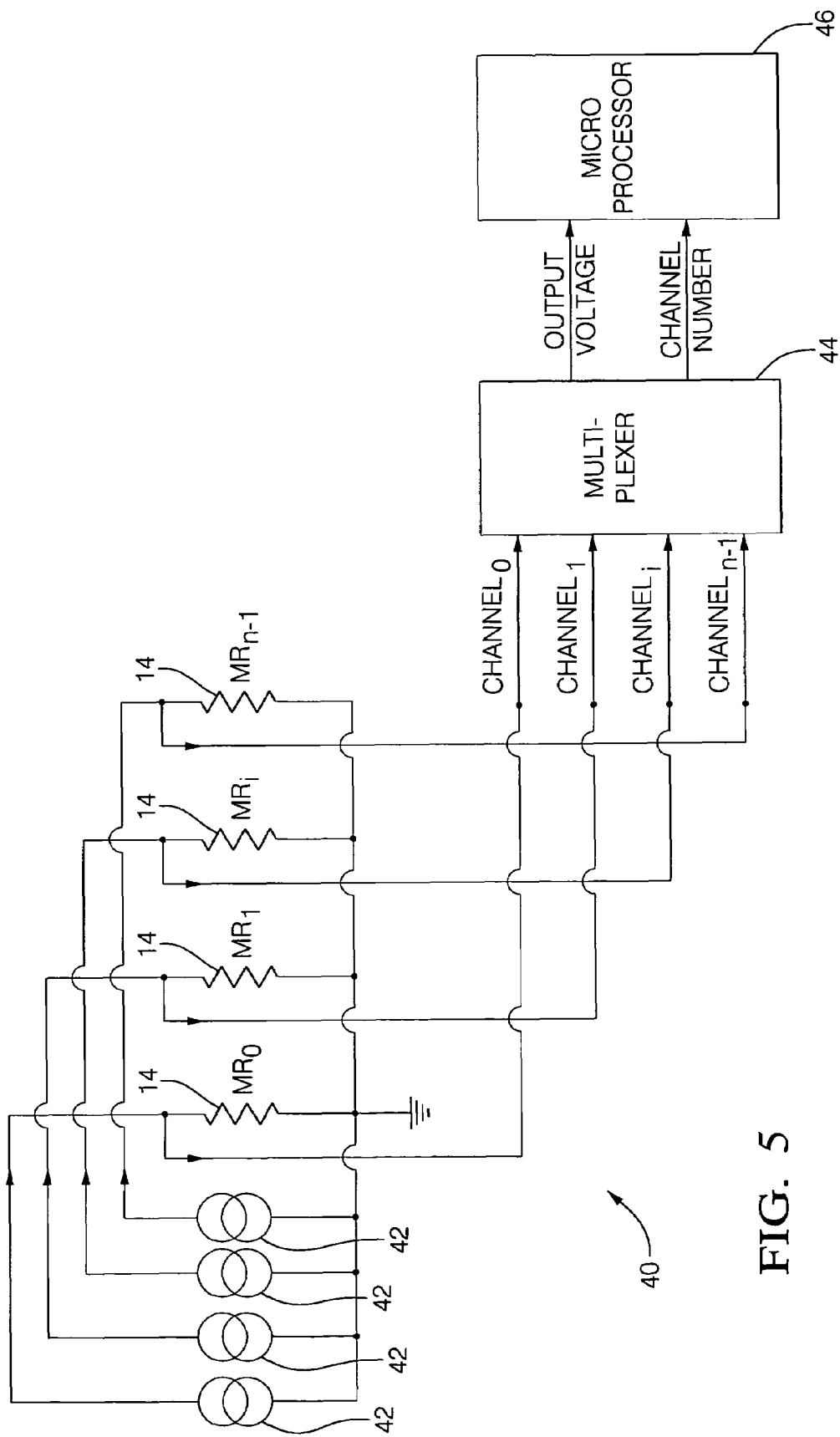
FIG. 5 is a circuit diagram including a circuit for exciting a magnetoresistor sensor array and a circuit for measuring the resultant magnetic flux density through the array elements.

Two examples of processing circuitry that can be used to measure the voltage potential are shown in FIGS. 4 and 5. FIG. 4 shows processing circuitry 30 that can be used when the linear array 12 comprises a plurality of sensing elements 14 in the form of Hall elements. There are n sensing elements, labeled Hall #0, Hall #1, . . . Hall #i, . . . Hall #n−1. Excitation of the sensing elements 14 can be performed by many different circuit designs. In this embodiment, excitation is performed by a voltage supply 32. Each sensing element 14 is connected to the voltage supply 32.

The remainder of the processing circuitry 30 provides a circuit for acquiring the measurement of the magnetic flux density for each array element 14 and for determining the peak from at least some of those measurements. As the voltage from the voltage supply 32 is applied across each of the sensing elements 14, Hall #0, Hall #1, . . . Hall #i, . . . Hall #n−1, leads from each of the sensing elements 14 delivers the Hall voltage and provides each Hall voltage signal to respective channels, Channel 0, Channel 1, . . . Channel i, . . . Channel n−1, of a multiplexer 34. The multiplexer 34 provides an output voltage associated with each channel number to a microprocessor 36 for additional processing and/or display. The additional processing includes, for example, the determination of the maximum (or minimum) of the curve fitted to the measured values as described in more detail herein. The microprocessor 36 can be, for example, part of a standard engine controller. In any case, memory may be required for storing the output data.

Of course, other processing circuitry known to those of skill in the art can be used to excite a magnetic element and to measure a resulting magnetic flux density. For example, FIG. 5 shows processing circuitry 40 that can be used when the linear array 12 comprises a plurality of sensing elements 14 in the form of magnetoresistive (MR) elements. Like in FIG. 4, there are n sensing elements 14, labeled $MR_0$, $MR_1, \ldots MR_i, \ldots MR_{n-1}$. Excitation of the sensing elements 14 can be performed by any number of circuit designs. In this embodiment, excitation is performed by one or more current sources 42. Each sensing element 14 is connected to a current source 42 by a lead.

The remainder of the processing circuitry 40 provides a circuit for acquiring the measurement of this magnetic flux density for each array element 14 and for determining the peak from at least some of those measurements. As the current from a current source 42 flows into each of the sensing elements 14, $MR_0, MR_1, \ldots MR_i, \ldots MR_n\_1$, a lead from each of the sensing elements 14 detects a voltage drop and provides each voltage drop to respective channels, Channel 0, Channel 1 , . . . Channel i, . . . Channel n−1, of a multiplexer 44. The multiplexer 44 provides an output voltage associated with each channel number to a microprocessor 46 for additional processing and/or display. As described with respect to FIG. 4, the additional processing includes, for example, the determination of the maximum (or minimum) of the curve fitted to the measured values as described in more detail herein. Again, the microprocessor 46 can be part of a standard engine controller or a standalone microcontroller. In any case, memory may be required for storing the output data.

As mentioned, FIG. 2 graphs the voltage measured for each of the sensing elements 14 of the linear array 12 of FIG. 1. The magnetic strip target 20 is located at a known position of 850 microns from array element number 0. The strip target 20 is a 0.1 mm-thick blade narrower than the spacing d between adjacent sensing elements 14. The spacing d is 160 microns, and the width of the strip target 20 is 100 microns, by example. The air gap 19 defined by the distance between the bottom of the strip target 20 and the top surfaces of the sensing elements 14 is 0.2 mm, by example. The magnet 18 needs to be thick enough to generate a magnetic flux sufficient for a peak to be detected in the presence of the target. By example, the magnet 18 is about five millimeters thick. In FIG. 2, the maximum in the measured voltage is between the element numbers 5 and 6 of the sensing elements 14. By interpolation, the strip target 20 is between array element numbers 5 and 6 centered at position 5.3215 (850 μm/160 μm).

It is desirable that the target be comparable in width to the spacing d between adjacent sensing elements 14, because, depending upon the spacing d of adjacent sensing elements 14, this yields a relatively accurate sensor 10. Even more desirable is a target narrower than the spacing d. However, as the target becomes narrower, it is more likely to be damaged, and too narrow a target will saturate. These factors must be balanced with the goal being merely to produce a peak or valley in the magnetic flux density waveform that is roughly symmetrical about the location of the maximum or minimum value. It is also worth noting that the strip target 20, like other targets resulting in a peak, is typically narrower than, and extends further in a direction normal to the length of the magnet 18 (the "depth"), than a target needed to achieve a valley having the same magnetic profile as the peak. For example, to produce a valley having the same magnetic profile as the curve of FIG. 2 using a slot target 22 in a magnetic block 26, the slot target 22 would have a depth of 1.0 mm and a width of about 0.5 mm. In this case, the graph would be a valley with a minimum voltage at the position of the slot target 22.

Although the position of the strip target 20 was known in the example of FIG. 2, the sensor 10 is designed to be used where the position of a target is the unknown. With targets in the form of magnetic teeth, such as those shown in FIG. 3A, the highest point of the peak in the magnetic flux density curve is at the location, or center, of the target. Conversely, with magnetic slot targets such as that shown in FIG. 3B, the lowest point of the valley that represents the magnetic flux density curve is at the location, or center, of the target. This highest or lowest point can be determined analytically by fitting a function having a peak or valley, e.g., cosine, sine, or a $2^{nd}$-order or higher polynomial, to several of the measurements obtained from sensing elements 14 closest to the peak and then computing the location of the maximum (or minimum) of the function.

However, the fitting of some functions requires far more computation than that of others without improved accuracy. Testing shows that very accurate results can be obtained by fitting a parabola to just three points—three sequential values of the measured flux density value that include the highest point measured when the magnetic flux density curve includes a peak (or the lowest point measured when the magnetic flux density curve includes a valley). In this case, the position P of the maximum or minimum of the curve can be computed directly, without using a regression method. The interpolated position P corresponding to the location of the target along the length of the array 12 relative to the array element numbers is given by the following formula:

$$P = .5 \left( \frac{j_1^2(V_3 - V_2) + j_2^2(V_1 - V_3) + j_3^2(V_2 - V_1)}{j_1(V_3 - V_2) + j_2(V_1 - V_3) + j_3(V_2 - V_1)} \right);$$

where $j_1$ is the array element number of the highest or lowest measured voltage, where a measured voltage $V_1$ represents the magnetic flux density value at the array element $j_1$;

$j_2$ is a second array element number in a sequence of three array elements including array element number $j_1$;

$j_3$ is a third array element number in the sequence of three array elements including array element number $j_1$;

$V_1$ is the highest or lowest measured output voltage;

$V_2$ is the output voltage associated with array element number $j_2$; and $V_3$ is the output voltage associated with array element number $j_3$.

Several examples can be provided using an array 12 with n array elements and where the first array element is i=0 and the last array element is i=n−1. If the first array element 0 senses the highest (or lowest) field, array element numbers 0, 1 and 2 and their associated output voltages can be used. Similarly, if the last array element n−1 senses the highest (or lowest) field, array element numbers n−1, n−2 and n−3 and their associated output voltages can be used. Another example is shown in FIG. 6.

Figure 6:
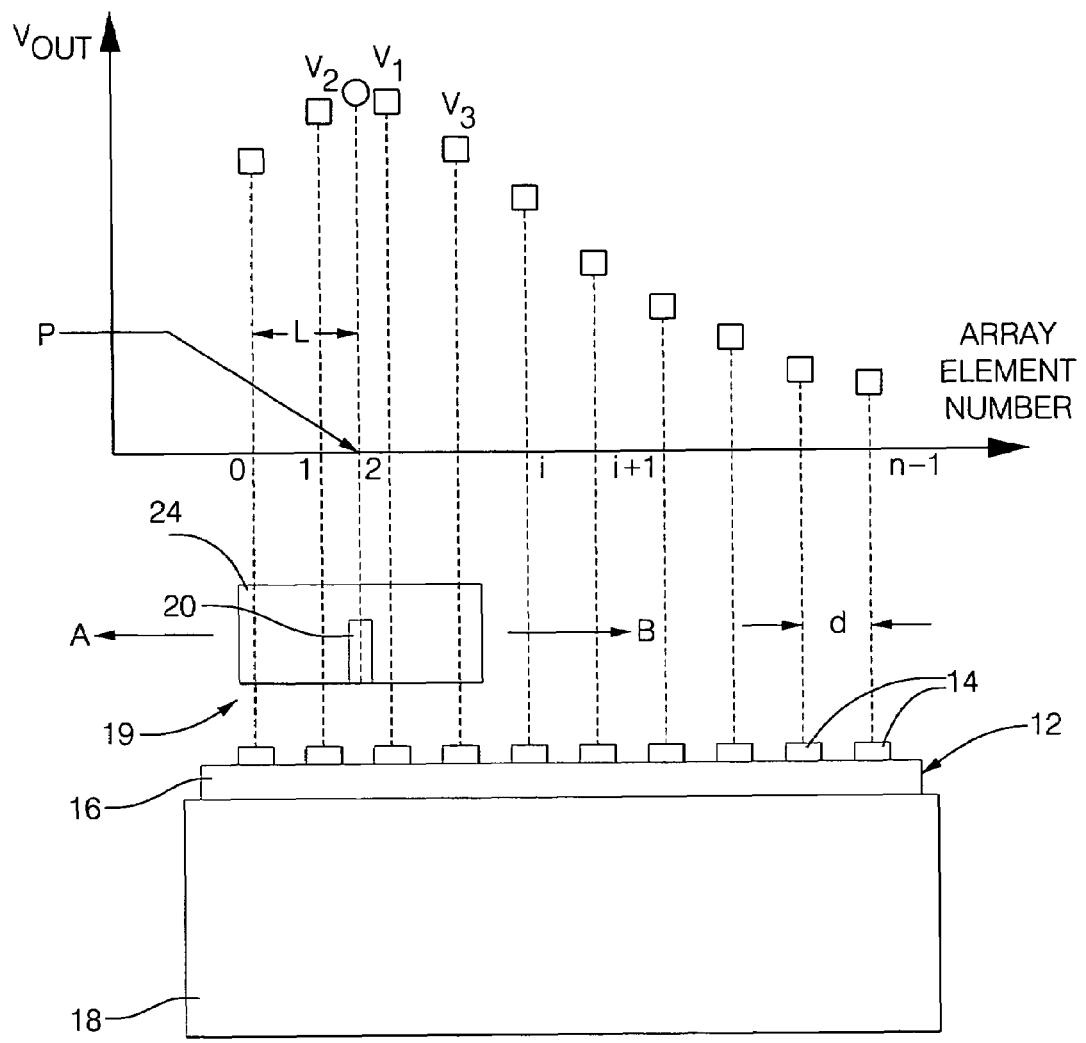
FIG. 6 is a cross-sectional view of an array sensor according to FIG. 1 with a graph illustrating the three-point parabola fit method of the present invention.

FIG. 6 shows the derivation of the peak P and the position of the magnetic strip target 20 using this three point parabola fit method when the highest or lowest field is measured somewhere other than the first or last array element 14. In FIG. 6, similar to FIG. 1, a freely-movable magnetic strip target 20 is positioned above a linear array 12 mounted on a magnet 18. The strip target 20 is shown centered on and supported by a nonmagnetic slider 24. An air gap 19 separates the target 20 from identical sensing elements 14 equidistantly spaced at a distance d of 160 microns. There are n sensing elements 14, which are designated in the graph as array element number i=0 to array element number i=n−1. The highest measured voltage $V_1$ is associated with i=2, that is, array element number 2. In the example shown, array element i−1, i.e., array element number 1, and array element i+1, i.e., array element number 3, are used in the above formula, together with their associated output voltages, $V_2$ and $V_3$, respectively. Thus, the position P of the voltage peak relative to the position of the array elements can be determined. Herein, we assume that the formula yields a value P of 1.67. The strip target 20 is located at a location L relative to the position of the first array element, such as array element number 0. The location L is determined from the following equation:

$$L = P \times d; \text{ where}$$

L is the location of the target 20 along the linear array 12 relative to the position of the first array element;

P is the position of the maximum or minimum measured voltage along the length of the linear array 12 relative to the sensing elements 14; and d is the distance between adjacent sensing elements 14 of the linear array 12.

Thus, in the example of FIG. 6, the location L is equal to 267 microns (1.67×160 μm).

Notice, however, that there is more than one sequence of three array elements that include array element number 2 (i=2). Another sequence of three array elements that includes array element number i=2 also includes array element numbers i−1 and i−2, array element numbers 1 and 0, respectively. Yet another sequence of three array elements that includes array element number i=2 also includes array element numbers i+1 and i+2, array element numbers 3 and 4. It has been shown that even more accurate results can be obtained using the three point parabola fit method, when possible, by calculating two positions P using two separate sequences, then averaging the two positions P. Although up to three sequences are available where the highest or lowest field is measured somewhere other than the first or last array element 14, any additional accuracy due to the inclusion of the third sequence in the calculation of position does not appear to justify the additional computation required.

Figure 7:
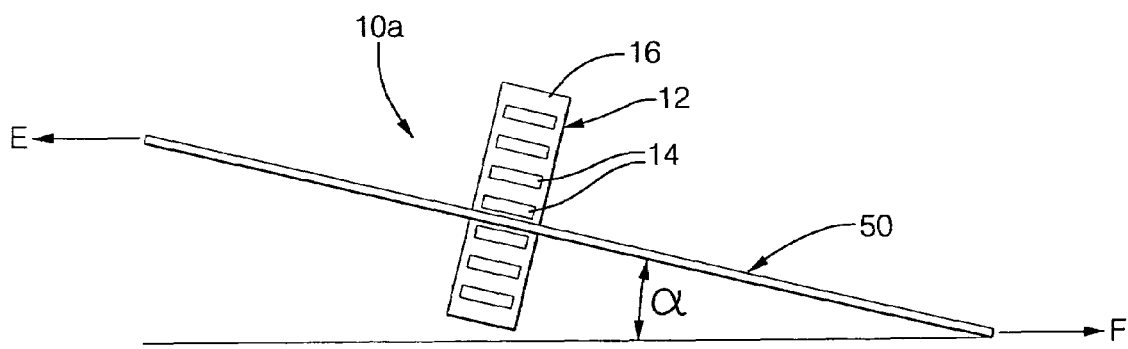
FIG. 7 is an illustration of the use of the linear array according to FIG. 1 in a linear sensor.

The linear array 12 described can be used in high accuracy linear and angular position sensors as shown in FIGS. 7-10. FIG. 7 shows a linear array 12 where a strip target 50 is positioned at a fixed angle a with respect to the direction of displacement of the strip target 50. For simplicity, the magnet 18 and the supporting block are not shown. As the block supporting the strip target 50 is displaced in the directions indicated by the arrows E and F, the strip target 50 freely moves between sensing elements 14 of the linear array 12 in the directions indicated by the arrows A and B in FIGS. 1 and 6. The linear range R of this linear sensor 10a is determined by the following formula:

$$R = D/\sin \alpha; \text{ where}$$

R is the linear range of the linear sensor 10a;

D is the distance between the first and last sensing elements 14; and

α is the angle of the strip target 50 with respect to the direction of displacement of the strip target 50.

In FIG. 7, where D equals 2.0 mm and the angle α equals five degrees, the linear range R is equal to 22.9 mm (2.0 mm/sin 5°). The location of the strip target 50 along the length of the linear array 12 can be determined as described with reference to FIG. 6. Because the motion normal to the linear array 12 is reduced in the configuration of FIG. 7, the configuration allows the same linear range R of the sensor 10 while using a linear array 12 of a shorter length. A linear sensor, such as sensor 10a shown in FIG. 7, can be used in a variety of applications and devices. For example, such a sensor can be used for body height sensing in shock absorbers.

Another application can be to measure the relative movement of a piston in a master cylinder. A linear sensor according to the present invention can also be used to measure the movement of a seat by mounting the linear array 12 on the stationary rail of a seat and by mounting a target to the movable seat. Many other applications of a linear sensor incorporating the present invention are possible.

FIGS. 8A-8C show the linear array 12 being used in an angular position sensor 10b. The sensor 10b measures the rotational angle of a rotating shaft 31 in, for example, a motor. A spiral magnetic tooth or slot forms the target. Here, the target is a spiral magnetic strip 52 mounted on an annular non-magnetic disk 54. Of course, other target configurations using an annular mount are possible. The disk 54 is fixedly mounted to the shaft 31 such that the disk 54 rotates with the shaft 31 about a rotational axis 28. The linear array 12 is fixedly mounted adjacent the disk 54 that the sensing elements 14 face the spiral target 52. For example, in a motor, the linear array 12 can be mounted on the stator according to known methods. As the disk 54 rotates, the spiral target 52 transverses the linear array 12. Each location of the spiral target 52 along the length of the linear array 12 corresponds to a unique angle of rotation such that:

$$R(\beta) = r + \beta(R-r)/360°; \text{ where}$$

R (β) is the radius of the spiral target 52 at an angle of rotation β;

R is the known maximum radius of the spiral target 52; and r is the known minimum radius of the spiral target 52.

The range of movement of the spiral target 52 is equal to R-r. Preferably, then, the length of the linear array 12 is designed so that it is slightly longer than the range (R-r) such that the spiral target 52 travels from about the midpoint between the first and second sensing elements 14, array element numbers 0 and 1, and about the midpoint between the last two sensing elements 14, array element numbers n−2 and n−1, wherein n is the number of sensing elements 14. The processing circuitry, such as that shown in FIGS. 4 and 5, generates a linear function of the angle α. It can also compute and output, in addition to the angle β, any desired function or functions of the angle β required in particular applications, e.g., sin β, cos β, sin 3β, etc. A graph of the magnetic image resulting from the angular sensor of FIGS. 8A-8C is similar to that shown in FIGS. 2 and 6.

Figure 9:
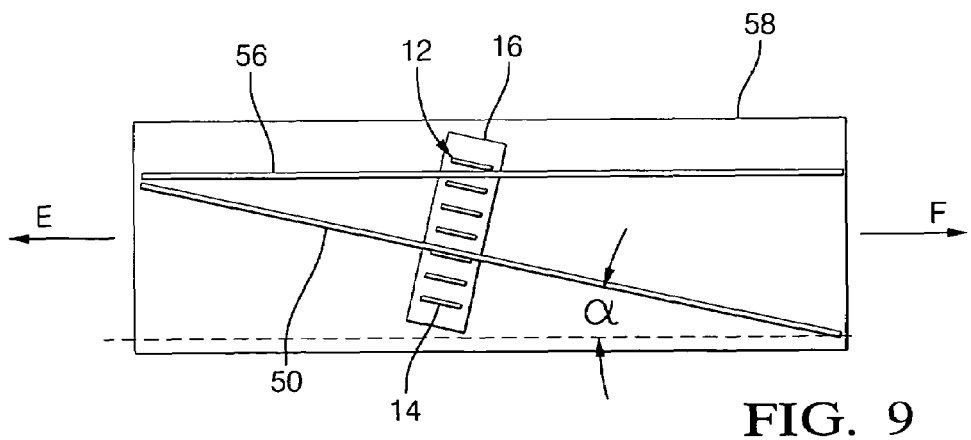
FIG. 9 is a plan view of a target of the linear sensor according to FIG. 7 with the inclusion of side offset compensation.

Linear position sensors in industrial and automotive applications are often affected by inadvertent fixed or variable side offsets of the target due to, for example, the tolerance(s) of assembly parts or due to the target being bent over time. Similarly, angular position sensors in industrial and automotive applications are often affected by eccentricity errors caused by imprecise or worn out shafts, bushings or bearings. Thus, it is desirable that the linear position sensor 10a and the angular position sensor 10b be immune to or otherwise capable of compensating for these errors. FIG. 9 shows a portion of the linear position sensor according to FIG. 7 modified to include side offset compensation. In this embodiment, the strip target 50 is embedded in a non-magnetic block 58. A second magnetic strip is a second target 56 that is also embedded in the non-magnetic block 58. The reference strip target 56 travels linearly in the direction of movement of the non-magnetic block 26 (in the direction of arrows E and F). This reference strip target 56 is a reference for compensating for side offset-related errors, as discussed in more detail below.

Figure 8:
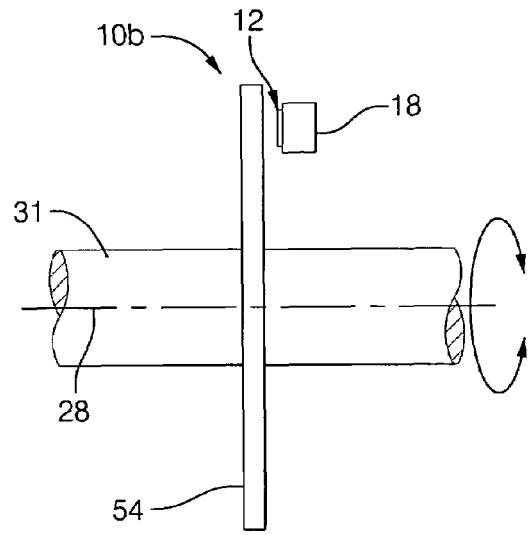
FIGS. 8A-8C are illustrations of the use of the linear array according to FIG. 1 in an angular sensor.
Figure 8:
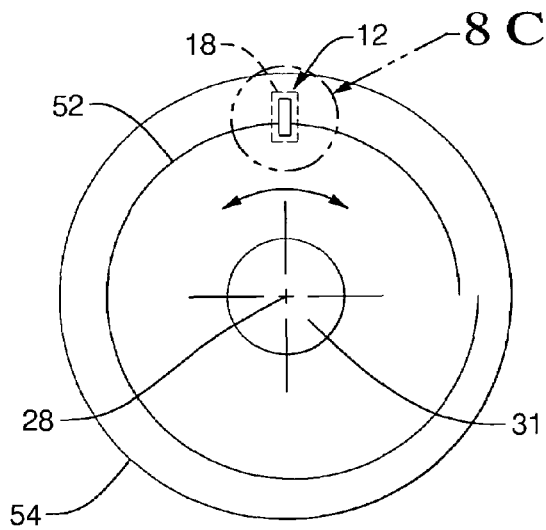
Figure 8:
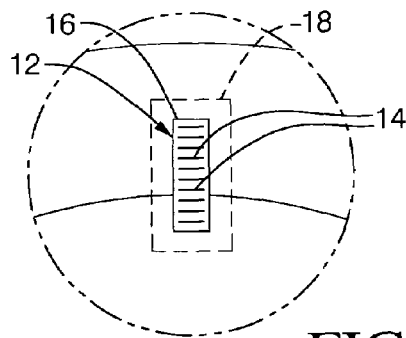
Figure 10:
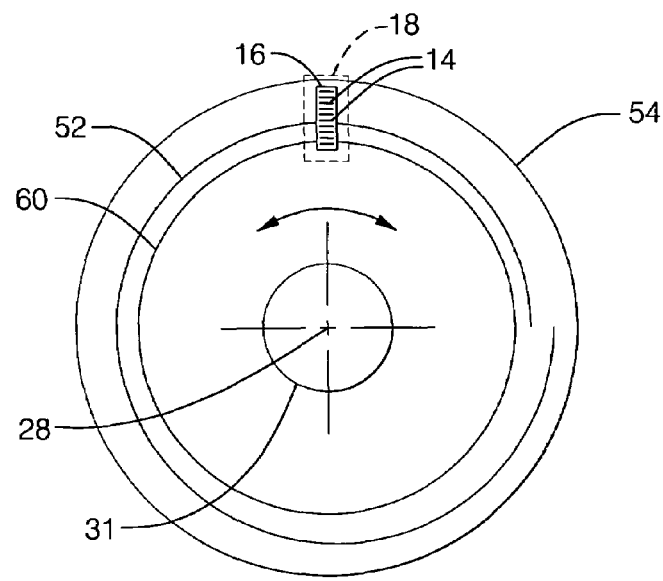
FIG. 10 is a plan view of a target of the angular sensor according to FIG. 8 with the inclusion of eccentricity compensation.

FIG. 10 shows the addition of a reference track to the disk 54 of FIG. 8. Here, the reference track is a circular target 60 comprising a second magnetic strip concentric with the spiral target 52. The circular target 60 acts as a reference track for compensating for eccentricity-related errors. Although shown in FIG. 10 as located radially inside the spiral target 52, it can be located radially outside the spiral target 52. The circular reference target 60 is read by the first three sensing elements 14 of the linear array 12, while the spiral measuring target 52 is read by array element number 3 through array element number n-1, depending on the angular position, where n is the number of sensing elements 14 and the first sensing element 14 is array element number 0.

Figure 11:
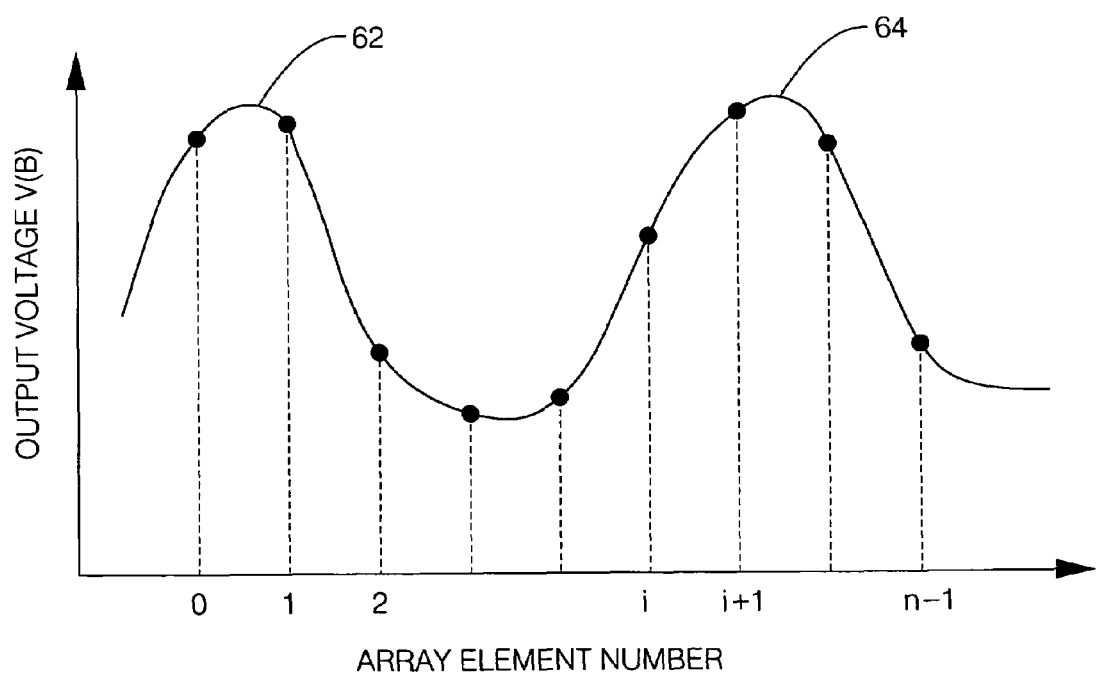
FIG. 11 is a graph representative of the magnetic flux density curve resulting from the sensor according to either FIG. 9 or FIG. 10.
Figure 12:
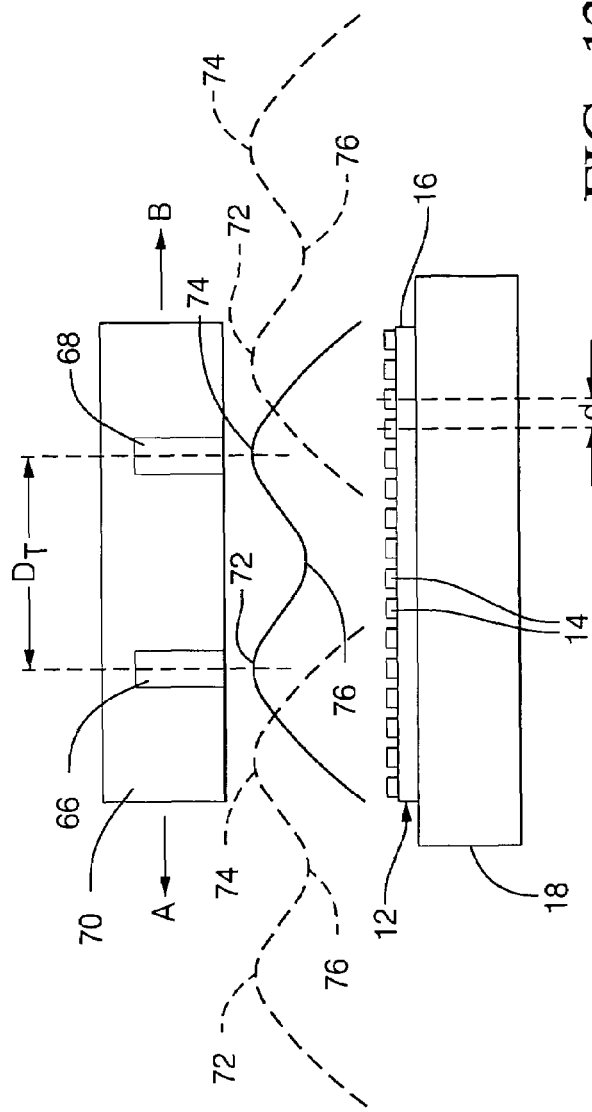
FIG. 12A is a cross-sectional view of an array sensor including a dual target shown with a graph of the magnetic image resulting from the array sensor at three positions of the dual target along the surface of the magnet.
FIG. 12B is an illustration of the use of an array sensor in accordance with FIG. 12A in a linear sensor.
Figure 12:
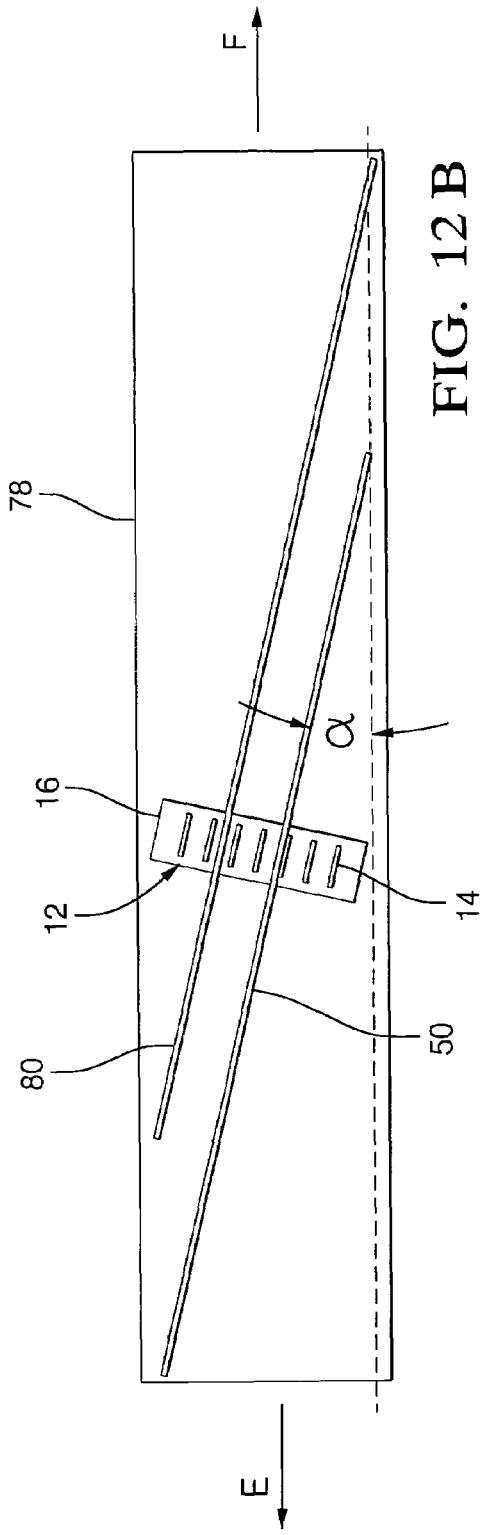

FIG. 11 is a graph representative of the magnetic flux density curve resulting from either a linear sensor in accordance with FIG. 9 or an angular sensor in accordance with FIG. 10. Each measuring target, strip target 50 in FIG. 9 or spiral target 52 in FIG. 10, and reference target, reference strip target 56 in FIG. 9 or circular reference target 60 in FIG. 10, produces a peak. Either of the reference targets 56, 60 will produce a stationary peak 62 with respect to the linear array 12 when there is no side offset or eccentricity. The measuring targets 50, 52 produce a moving peak 64 with respect to the linear array 12. The location of the maximum of each peak 62, 64 can be determined by any of the curve-fitting methods mentioned previously. The presence of a side offset or eccentricity affects both targets equally. Thus, the effect of a side offset or eccentricity can be completely eliminated by using the difference in the maximum locations as the measure of linear or angular position.

Because a larger die 16 is needed as the number of magnetic sensing elements 16, such as MRs or Hall sensors, increase, the cost of producing a basic array position sensor 10 as described with respect to FIGS. 1-5 capable of measuring ever larger displacements increases. While the length of the linear array 12 defines the dynamic range R of the array sensor 10, accuracy and resolution depend on the distance d between sensing elements 14 and the algorithms used in interpolating the peak. Thus, one way to increase the dynamic range R while maintaining the same absolute accuracy is to lengthen the linear array 12 and proportionally increase the number of sensing elements 14. This not only increases the cost of the die, but also the complexity and cost of the processing circuitry. It is unlikely that automotive or other industrial applications can justify the cost of dies accommodating linear arrays longer than some three mm.

One method of extending the range of a linear array for linear applications has been described previously in FIG. 7. Another method of extending the range of a linear array to use a dual target as is shown in FIGS. 12A and 12B. The embodiment of the dual target shown in FIG. 12A comprises two parallel magnetic strip targets 66, 68 separated by a distance $D_T$ in a non-magnetic block 70. Of course, the dual target can be any of the other target configurations described as long as each target produces a magnetic profile having a peak or valley. In this embodiment, each target 66, 68 is wider than the distance d between adjacent sensing elements 14, by example. Preferably, the distance $D_T$ is less than or equal to D/2, half of the distance between the first and last sensing elements 14. This extends the dynamic range of the sensor to approximately D*2 without increasing the length of the linear array 12.

The presence of the two strip targets 66, 68 results in a magnetic profile in the linear array 12 having a distinct first peak 72 and a distinct second peak 74, with a valley 76 between the two peaks 72, 74. The distance D between the strip targets 66, 68, is such that the linear array 12 experiences at least one of the peaks 72, 74 at all times. When the non-magnetic block 70 is in its leftmost position (in the direction of the arrow A), the second peak 74 is located at the beginning of the linear array 12. The processing circuitry recognizes that the peak is the second peak 74 because it is not followed by the valley 76. As the dual target on the non-magnetic block 70 moves in the direction indicated by the arrow B, the second strip target 68 moves toward the middle of the linear array 12. The processing circuitry identifies the peak as the second peak 74 by its detection of the valley 76 to the left of the peak. The locations of the maximum of each of the peaks 72, 74 and the minimum of the valley 76 can be determined by any of the curve fitting methods mentioned above.

FIG. 12B shows a practical implementation of the principles of FIG. 12A in a modified linear sensor based upon FIG. 7. FIG. 12B shows a linear array 12 where each strip target 50, 80 of a dual strip target are embedded in a non-magnetic block 78 and are positioned at a fixed angle α with respect to the direction of displacement of the strip targets 50, 80. For simplicity, the magnet 18 is not shown. As the block 78 supporting the strip targets 50, 80 is displaced in the directions indicated by the arrows E and F, the strip targets 50, 80 freely move between sensing elements 14 of the linear array 12 in the directions indicated by the arrows A and B in FIGS. 1 and 6.

The use of an array, and particularly a linear array 12, of sensing elements increases sensor accuracy over differential sensors by decreasing the interpolation range between sensing elements and by permitting the use of nonlinear curve-fitting algorithms that require only relative values of the output signals from the sensing elements.

The sizes mentioned herein for the target, magnet, spacing d and length D are by example only. A linear array with a long length D is more expensive. The smaller the spacing d, the more accurate the sensor for the same length D of the linear array since it has more sensing elements. However, the smaller the spacing d, the smaller the air gap should be. Thus, assembly tolerances become an issue. The balance between tight tolerance requirements, accuracy and size, which equates directly to price, is application-specific and can be determined by one of skill in the art based upon the teachings herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A magnetic position sensor for measuring one of a linear position and an angular position of a device, the sensor comprising:
   a linear array of at least three galvanomagnetic sensing elements fixedly mountable adjacent the device;
   a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and, wherein a width of the target moving adjacent the surface of the linear array is equal to or narrower than a distance between adjacent sensing elements;
   a first circuit for exciting each of the sensing elements; and
   a second circuit for measuring the magnetic flux density value at each of the sensing elements, wherein at least one of a maximum of the peak and a minimum of the valley indicates one of the linear position and the angular position of the device.

2. The magnetic position sensor according to claim 1 wherein each of the sensing elements comprises one of a Hall element and a magnetoresistive element.

3. The magnetic position sensor according to claim 1 wherein the target is one of a magnetic tooth and a magnetic slot.

4. The magnetic position sensor according to claim 1 wherein the first circuit comprises at least one of a constant voltage source and a constant current source.

5. The magnetic position sensor according to claim 4 wherein the second circuit comprises a circuit for measuring a voltage potential at each of the sensing elements, wherein each voltage potential represents a magnetic flux density value of the magnetic flux density curve.

6. The magnetic position sensor according to claim 1, further comprising:
   side offset compensation for compensating for errors in measurement of linear position using the target.

7. The magnetic position sensor according to claim 1 wherein the second circuit further comprises means for fitting the magnetic flux density value associated with certain of the galvanomagnetic sensing elements to a function having at least one of a peak curve and a valley curve, and wherein at least one of a location of a minimum and a location of a maximum of the function indicates one of the linear position and the angular position of the device.

8. The magnetic position sensor according to claim 1, further comprising:
   means for determining at least one of the maximum of the peak and the minimum of the valley using magnetic flux density values measured at certain of the sensing elements.

9. A magnetic position sensor for measuring one of a linear position and an angular position of a device, the sensor comprising:
   a linear array of galvanomagnetic sensing elements fixedly mountable adjacent the device;
   a target connectable to the device such that the target moves adjacent a surface of the linear array in response to movement of the device, the target shaped so that a magnetic flux density curve resulting from excitation of the sensing elements includes at least one of a peak and a valley; and wherein the target comprises a magnetic tooth in the form of a spiral magnetic strip supported by a non-magnetic disk, the spiral magnetic strip starting at a first point a first radial distance from a center of the disk and continuing around a circumference of the non-magnetic disk along a path having a continuously-increasing radius until the strip reaches a second point having a second radial distance from the center of the disk; and wherein the non-magnetic disk is mountable on a shaft rotatable with movement of the device;
   a first circuit for exciting each of the sensing elements;
   a second circuit for measuring a magnetic flux density value at each of the sensing elements, wherein each magnetic flux density value is associated with the magnetic flux density curve and wherein at least one of a maximum of the peak and a minimum of the valley indicates one of the linear position and the angular position of the device; and
   a second magnetic tooth in the form of an annular magnetic strip supported by the non-magnetic disk, the annular magnetic strip one of radially inside the spiral magnetic strip and radially outside the spiral magnetic strip, and the annular magnetic strip concentric with the non-magnetic disk.

10. The magnetic position sensor according to claim 9, further comprising:
    means for subtracting a location of a second peak of a magnetic flux density curve resulting from the annular magnetic strip from a location of the peak of the magnetic flux density curve resulting from the spiral magnetic strip.

11. A method of measuring one of a linear position and an angular position of a device, comprising the steps of:
    fixedly mounting a linear array of at least three galvanomagnetic sensing elements adjacent the device;
    connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
    exciting each of the sensing elements; and
    measuring a magnetic flux density value at each of the sensing elements, wherein at least one of a maximum of the peak and a minimum of the valley indicates one of the linear position and the angular position of the device.

12. The method according to claim 11 wherein the fixedly mounting step further comprises the step of stationarily mounting the linear array adjacent the device such that the linear array does not move with movement of the device.

13. The method according to claim 11 wherein the connecting step further comprises the step of connecting one of a magnetic mount and a non-magnetic mount to the device wherein the target is one of a slot in the magnetic mount and a magnetic strip embedded in the non-magnetic mount.

14. The method according to claim 11 wherein the exciting step further comprises the step of applying one of a constant current and a constant voltage to each of the sensing elements.

15. The method according to claim 11 wherein the measuring step further comprises the step of measuring a voltage across each of the sensing elements; and wherein each voltage represents a magnetic flux density value.

16. The method according to claim 11, further comprising the steps of:
   fitting certain of the magnetic flux density values measured in the measuring step to a function having at least one of a peak curve and a valley curve; and
   computing at least one of a location of a maximum of the function and a location of a minimum of the function.

17. The method according to claim 11, further comprising the step of:
   compensating for errors in a measurement of linear position using side offset compensation.

18. The method according to claim 11, further comprising the step of:
   developing the magnetic flux density curve using magnetic flux density values measured at certain of the sensing elements.

19. The method according to claim 11, further comprising the step of:
   determining at least one of a location of the maximum of the peak and a location of the minimum of the valley using magnetic flux density values measured at certain of the sensing elements.

20. A magnetic position sensor for measuring one of a linear position and an angular position of a device, the sensor comprising:
   a linear array of at least three galvanomagnetic sensing elements fixedly mountable adjacent the device;
   a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
   a first circuit for exciting each of the sensing elements; and
   a second circuit for measuring the magnetic flux density value at each of the sensing elements, wherein at least one of a maximum of the peak and a minimum of the valley indicates one of the linear position and the angular position of the device,
   wherein the target comprises one of two magnetic teeth separated by a target spacing and two magnetic slots separated by the target spacing; and wherein the target spacing is less than half the distance between a first galvanomagnetic sensing element and a last galvanomagnetic sensing element of the linear array.

21. A magnetic position sensor for measuring one of a linear position and an angular position of a device, the sensor comprising:
   a linear array of at least three galvanomagnetic sensing elements fixedly mountable adjacent the device;
   a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
   a first circuit for exciting each of the sensing elements; and
   a second circuit for measuring the magnetic flux density value at each of the sensing elements, wherein at least one of a maximum of the peak and a minimum of the valley indicates one of the linear position and the angular position of the device, and
   wherein the target is operably positionable at a fixed angle $\alpha$ with respect to a direction of displacement of the target upon movement of the device such that a range of the sensor is equal to a distance between a first galvanomagnetic sensing element and a last galvanomagnetic sensing element of the linear array divided by $\sin \alpha$.

22. A magnetic position sensor for measuring one of a linear position and an angular position of a device, the sensor comprising:
   a linear array of at least three galvanomagnetic sensing elements fixedly mountable adjacent the device;
   a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
   a first circuit for exciting each of the sensing elements; and
   a second circuit for measuring the magnetic flux density value at each of the sensing elements, wherein at least one of a maximum of the peak and a minimum of the valley indicates one of the linear position and the angular position of the device, and
   wherein the target is operably positionable to move normal to a length of the linear array in response to movement of the device.

23. A magnetic position sensor for measuring one of a linear position and an angular position of a device, the sensor comprising:
   a linear array of at least three galvanomagnetic sensing elements fixedly mountable adjacent the device;
   a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
   a first circuit for exciting each of the sensing elements; and a second circuit for measuring the magnetic flux density value at each of the sensing elements, wherein at least one of a maximum of the peak and a minimum of the valley indicates one of the linear position and the angular position of the device, and wherein the target is one of a spiral magnetic tooth and a spiral magnetic slot rotatable about an axis.

24. The magnetic position sensor according to claim 23, further comprising:

eccentricity compensation means for compensating for eccentricity-related errors in a measurement of angular position using the target.

25. A magnetic position sensor for measuring one of a linear position and an angular position of a device, the sensor comprising:

a linear array of at least three galvanomagnetic sensing elements fixedly mountable adjacent the device;

a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

a first circuit for exciting each of the sensing elements; and a second circuit for measuring the magnetic flux density value at each of the sensing elements, wherein at least one of a maximum of the peak and a minimum of the valley indicates one of the linear position and the angular position of the device, and wherein the target comprises a magnetic tooth in the form of a spiral magnetic strip supported by a non-magnetic disk, the spiral magnetic strip starting at a first point a first radial distance from a center of the disk and continuing around a circumference of the non-magnetic disk along a path having a continuously-increasing radius until the strip reaches a second point having a second radial distance from the center of the disk; and wherein the non-magnetic disk is mountable on a shaft rotatable with movement of the device.

26. The magnetic position sensor according to claim 25 wherein each location of the spiral magnetic strip along a length of the linear array corresponds to a unique angle of rotation $\beta$ of the shaft according to the formula $R(\beta)=r+\beta(R-r)/360°$, wherein $R(\beta)$ is a radius of the spiral magnetic strip at the unique angle of rotation $\beta$, R is a larger of the first radial distance and the second radial distance, and r is the other of the first radial distance and the second radial distance.

27. A magnetic position sensor for measuring one of a linear position and an angular position of a device, the sensor comprising:

a linear array of at least three galvanomagnetic sensing elements fixedly mountable adjacent the device;

a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

a first circuit for exciting each of the sensing elements;

a second circuit for measuring the magnetic flux density value at each of the sensing elements, wherein at least one of a maximum of the peak and a minimum of the valley indicates one of the linear position and the angular position of the device; and means for determining at least one of the maximum of the peak and the minimum of the valley using magnetic flux density values measured at certain of the sensing elements, wherein certain of the sensing elements includes a set of three sequential sensing elements numbered $j_1, j_2, j_3$ respectively having three sequential magnetic flux density values $V_1, V_2, V_3$, one of the three sequential magnetic flux density values $V_1, V_2, V_3$ being one of a highest and a lowest of the magnetic flux density values measured by the second circuit; and wherein a position of the target relative to array element numbers is equal to $$\left( \frac{j_1^2(V_3 - V_2) + j_2^2(V_1 - V_3) + j_3^2(V_2 - V_1)}{j_1(V_3 - V_2) + j_2(V_1 - V_3) + j_3(V_2 - V_1)} \right).$$

28. A magnetic position sensor for measuring one of a linear position and an angular position of a device, the sensor comprising:

a linear array of at least three galvanomagnetic sensing elements fixedly mountable adjacent the device;

a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

a first circuit for exciting each of the sensing elements;

a second circuit for measuring the magnetic flux density value at each of the sensing elements, wherein at least one of a maximum of the peak and a minimum of the valley indicates one of the linear position and the angular position of the device; and means for determining at least one of the maximum of the peak and the minimum of the valley using magnetic flux density values measured at certain of the sensing elements, wherein certain of the sensing elements includes a first set of three sequential sensing elements numbered $j_1, j_2, j_3$ respectively having three sequential magnetic flux density values $V_1, V_2, V_3$, one of the three sequential magnetic flux density values $V_1, V_2, V_3$ being one of a highest and a lowest of the magnetic flux density values measured by the second circuit; and wherein certain of the sensing elements includes a second set of three sequential sensing elements numbered $j_4, j_5, j_6$ respectively having three sequential magnetic flux density values $V_4, V_5, V_6$, one of the three sequential magnetic flux density values $V_4, V_5, V_6$ also being the one of the highest and the lowest of the magnetic flux density values measured by the second circuit such that the sensing elements numbered $j_1$, $j_2$, $j_3$ and the sensing elements numbered $j_4$, $j_5$, $j_6$ overlap by at least one sensing element; and wherein a position of the target relative to array element numbers is equal to an average of $$\left( \frac{j_1^2(V_3 - V_2) + j_2^2(V_1 - V_3) + j_3^2(V_2 - V_1)}{j_1(V_3 - V_2) + j_2(V_1 - V_3) + j_3(V_2 - V_1)} \right) \text{ plus}$$

$$\left( \frac{j_4^2(V_6 - V_5) + j_5^2(V_4 - V_6) + j_6^2(V_5 - V_4)}{j_4(V_6 - V_5) + j_5(V_4 - V_6) + j_6(V_5 - V_4)} \right).$$

29. A magnetic position sensor for measuring one of a linear position and an angular position of a device, the sensor comprising:

a linear array of at least three galvanomagnetic sensing elements fixedly mountable adjacent the device;

a target connectable to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

a first circuit for exciting each of the sensing elements; and a second circuit for measuring the magnetic flux density value at each of the sensing elements, wherein at least one of a maximum of the peak and a minimum of the valley indicates one of the linear position and the angular position of the device, and wherein the target further comprises one of two spaced magnetic teeth and two spaced magnetic slots.

30. The magnetic position sensor according to claim 29 wherein the target comprises the two spaced magnetic teeth, the sensor further comprising:

means for determining a location of a maximum of a first peak of the magnetic flux density curve, the determining means operable to detect one of a presence and an absence of a minimum of the magnetic flux density curve; and wherein when the presence of the minimum is detected, the location of the maximum and the location of the minimum indicate the linear position of the device; and wherein when the absence of the minimum is detected, the location of the maximum and the absence of the minimum indicates the linear position of the device.

31. The magnetic position sensor according to claim 29 wherein the target comprises two spaced magnetic slots, the sensor further comprising:

means for determining a location of a minimum of a first valley of the magnetic flux density curve, the determining means operable to detect one of a presence and an absence of a maximum of the magnetic flux density curve; and wherein when the presence of the maximum is detected, the location of the minimum and the location of the maximum indicate the linear position of the device; and wherein when the absence of the maximum is detected, the location of the minimum and the absence of the maximum indicates the linear position of the device.

32. A method of measuring one of a linear position and an angular position of a device, comprising the steps of:

fixedly mounting a linear array of at least three galvanomagnetic sensing elements adjacent the device;

connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

exciting each of the sensing elements;

measuring a magnetic flux density value at each of the sensing elements, wherein at least one of a maximum of the peak and a minimum of the valley indicates one of the linear position and the angular position of the device; and rotating the target about an axis in response to movement of the device wherein the target is one of a spiral magnetic tooth and a spiral magnetic slot.

33. The method according to claim 32, further comprising the step of:

compensating for eccentricity-related errors in a measurement of angular position using the target.

34. A method of measuring one of a linear position and an angular position of a device, comprising the steps of:

fixedly mounting a linear array of at least three galvanomagnetic sensing elements adjacent the device;

connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

exciting each of the sensing elements; and measuring a magnetic flux density value at each of the sensing elements, wherein at least one of a maximum of the peak and a minimum of the valley indicates one of the linear position and the angular position of the device, and wherein the connecting step further comprises the step of mounting an annular disk on a shaft rotatable with movement of the device, wherein the target is a spiral magnetic strip supported by a non-magnetic disk, the spiral magnetic strip starting at a first point a first radial distance from a center of the disk and continuing around a circumference of the non-magnetic disk along a path having a continuously-increasing radius until the strip reaches a second point having a second radial distance from the center of the disk.

35. A method of measuring one of a linear position and an angular position of a device, comprising the steps of:

fixedly mounting a linear array of at least three galvanomagnetic sensing elements adjacent the device;

connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

exciting each of the sensing elements; and measuring a magnetic flux density value at each of the sensing elements, wherein at least one of a maximum of the peak and a minimum of the valley indicates one of the linear position and the angular position of the device, and wherein the fixedly mounting step further comprises the step of stationarily mounting the linear array adjacent the device and facing the surface of the non-magnetic disk such that, upon rotation of the shaft, each location of the spiral magnetic strip along a length of the linear array corresponds to a unique angle of rotation $\beta$ according to the formula $R(\beta)=r+\beta(R-r)/360°$, wherein $R(\beta)$ is a radius of the spiral magnetic strip target at the unique angle of rotation $\beta$, R is a larger of the first radial distance and the second radial distance, and r is the other of the first radial distance and the second radial distance.

36. A method of measuring one of a linear position and an angular position of a device, comprising the steps of:
    fixedly mounting a linear array of at least three galvanomagnetic sensing elements adjacent the device;
    connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
    exciting each of the sensing elements; and
    measuring a magnetic flux density value at each of the sensing elements, wherein at least one of a maximum of the peak and a minimum of the valley indicates one of the linear position and the angular position of the device, and
    wherein an annular magnetic strip is supported by the non-magnetic disk one of radially inside the spiral magnetic strip and radially outside the spiral magnetic strip, the annular magnetic strip concentric with the non-magnetic disk.

37. The method according to claim 36, further comprising the step of:
    subtracting a position of a second peak of a magnetic flux density curve resulting from the annular magnetic strip from a position of the maximum of the peak of the magnetic flux density curve resulting from the spiral magnetic strip.

38. A method of measuring one of a linear position and an angular position of a device, comprising the steps of:
    fixedly mounting a linear array of at least three galvanomagnetic sensing elements adjacent the device;
    connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
    exciting each of the sensing elements; and
    measuring a magnetic flux density value at each of the sensing elements, wherein at least one of a maximum of the peak and a minimum of the valley indicates one of the linear position and the angular position of the device, and
    wherein the connecting step further comprises the step of positioning the target at a fixed angle $\alpha$ with respect to a direction of displacement of the target upon movement of the device such that a range of the sensor is equal to a distance between a first galvanomagnetic sensing element and a last galvanomagnetic sensing element of the linear array divided by $\sin \alpha$.

39. A method of measuring one of a linear position and an angular position of a device, comprising the steps of:
    fixedly mounting a linear array of at least three galvanomagnetic sensing elements adjacent the device;
    connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
    exciting each of the sensing elements; and
    measuring a magnetic flux density value at each of the sensing elements, wherein at least one of a maximum of the peak and a minimum of the valley indicates one of the linear position and the angular position of the device, and
    wherein the connecting step further comprises the step of positioning the target such that target moves normal to a length of the linear array upon movement of the device.

40. A method of measuring one of a linear position and an angular position of a device, comprising the steps of:
    fixedly mounting a linear array of at least three galvanomagnetic sensing elements adjacent the device;
    connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;
    exciting each of the sensing elements;
    measuring a magnetic flux density value at each of the sensing elements, wherein at least one of a maximum of the peak and a minimum of the valley indicates one of the linear position and the angular position of the device;

sequentially numbering each of the sensing elements of the linear array with an array element number;

finding a set of three sequential sensing elements numbered $j_1$, $j_2$, $j_3$ respectively having three sequential magnetic flux density values $V_1$, $V_2$, $V_3$, one of the three sequential magnetic flux density values $V_1$, $V_2$, $V_3$ being one of a highest and a lowest of the magnetic flux density values measured in the measuring step; and calculating a position of the target relative to array element numbers assigned in the sequentially numbering step according to the formula $$\left( \frac{j_1^2(V_3 - V_2) + j_2^2(V_1 - V_3) + j_3^2(V_2 - V_1)}{j_1(V_3 - V_2) + j_2(V_1 - V_3) + j_3(V_2 - V_1)} \right).$$

41. The method according to claim 40, further comprising the step of:

multiplying the position by a spacing between adjacent sensing elements of the linear array, wherein a result of the multiplying step is a location of the target relative to a first galvanomagnetic sensing element of the sensing elements.

42. A method of measuring one of a linear position and an angular position of a device, comprising the steps of:

fixedly mounting a linear array of at least three galvanomagnetic sensing elements adjacent the device;

connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

exciting each of the sensing elements;

measuring a magnetic flux density value at each of the sensing elements, wherein at least one of a maximum of the peak and a minimum of the valley indicates one of the linear position and the angular position of the device;

sequentially numbering each of the sensing elements of the linear array with an array element number;

finding a first set of three sequential sensing elements numbered $j_1$, $j_2$, $j_3$ respectively having three sequential magnetic flux density values $V_1$, $V_2$, $V_3$, one of the three sequential magnetic flux density values $V_1$, $V_2$, $V_3$ being one of a highest and a lowest of the magnetic flux density values measured in the measuring step;

finding a second set of three sequential sensing elements numbered $j_4$, $j_5$, $j_6$ respectively having three sequential magnetic flux density values $V_4$, $V_5$, $V_6$, one of the three sequential magnetic flux density values $V_4$, $V_5$, $V_6$ also being the one of the highest and the lowest of the magnetic flux density values measured in the measuring step such that the sensing elements numbered $j_1$, $j_2$, $J_3$ and the sensing elements numbered $j_4$, $j_5$, $j_6$ overlap by at least one sensing element; and calculating a position of the target relative to the array element numbers assigned in the numbering step, wherein the position is equal to an average of $$\left( \frac{j_1^2(V_3 - V_2) + j_2^2(V_1 - V_3) + j_3^2(V_2 - V_1)}{j_1(V_3 - V_2) + j_2(V_1 - V_3) + j_3(V_2 - V_1)} \right) \text{ plus}$$

$$\left( \frac{j_4^2(V_6 - V_5) + j_5^2(V_4 - V_6) + j_6^2(V_5 - V_4)}{j_4(V_6 - V_5) + j_5(V_4 - V_6) + j_6(V_5 - V_4)} \right).$$

43. A method of measuring one of a linear position and an angular position of a device, comprising the steps of:

fixedly mounting a linear array of at least three galvanomagnetic sensing elements adjacent the device;

connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

exciting each of the sensing elements; and measuring a magnetic flux density value at each of the sensing elements, wherein at least one of a maximum of the peak and a minimum of the valley indicates one of the linear position and the angular position of the device, and wherein the connecting step further comprises the step of connecting one of a magnetic mount and a non-magnetic mount to the device wherein the target is one of at least two spaced slots in the magnetic mount and at least two spaced magnetic strips embedded in the non-magnetic mount.

44. A method of measuring one of a linear position and an angular position of a device, comprising the steps of:

fixedly mounting a linear array of at least three galvanomagnetic sensing elements adjacent the device;

connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

exciting each of the sensing elements; and measuring a magnetic flux density value at each of the sensing elements, wherein at least one of a maximum of the peak and a minimum of the valley indicates one of the linear position and the angular position of the device, and wherein the target comprises two spaced magnetic teeth, the method further comprising the steps of:

determining a location of a maximum of a first peak of the magnetic flux density curve;

detecting one of a presence and an absence of a minimum of the magnetic flux density curve;

locating the linear position of the device using the location of the maximum and a location of the minimum when the detecting step indicates the presence of the minimum; and locating the linear position of the device using the location of the maximum and the absence of the minimum when the detecting step indicates the absence of the minimum.

45. A method of measuring one of a linear position and an angular position of a device, comprising the steps of:

fixedly mounting a linear array of at least three galvanomagnetic sensing elements adjacent the device;

connecting a target to the device such that the target moves adjacent a surface of the linear array in response to movement of the device, the target shaped so that a magnetic flux density curve resulting from excitation of the sensing elements includes at least one of a peak and a valley, the magnetic flux density curve comprising a magnetic flux density value at each of the sensing elements; and wherein a width of the target moving adjacent the surface of the linear array is equal to or narrower than a distance between adjacent sensing elements;

exciting each of the sensing elements; and measuring a magnetic flux density value at each of the sensing elements, wherein at least one of a maximum of the peak and a minimum of the valley indicates one of the linear position and the angular position of the device, and wherein the target comprises two spaced magnetic slots, the method further comprising the steps of:

determining a location of a minimum of a first valley of the magnetic flux density curve;

detecting one of a presence and an absence of a maximum of the magnetic flux density curve;

locating the linear position of the device using the location of the minimum and a location of the maximum when the detecting step indicates the presence of the maximum; and locating the linear position of the device using the location of the minimum and the absence of the maximum when the detecting step indicates the absence of the maximum.

* * * * *